United States Patent [19]
Mellick

[11] Patent Number: 5,136,909
[45] Date of Patent: Aug. 11, 1992

[54] PORTABLE BULK ARROW SHAFT GUIDE, SUPPORT, SECUREMENT, MEASUREMENT, AND GUIDED MITER-LIKE RAZOR SAW CUTOFF ASSEMBLY

[76] Inventor: Gary D. Mellick, 5941 Hwy. 24, Moxee City, Wash. 98936

[21] Appl. No.: 699,937

[22] Filed: May 14, 1991

[51] Int. Cl.$^5$ .............................................. B26D 7/02
[52] U.S. Cl. ....................................... 83/762; 83/454; 83/465; 83/466.1; 83/468; 83/468.7; 83/522.19; 83/758; 83/821; 269/287; 269/298
[58] Field of Search ............... 83/762, 454, 456, 466, 83/468, 462, 465, 468.7, 522.19, 758, 765, 781, 821, 466.1; 269/287, 296, 152, 87.2, 38, 297, 298, 300

[56] References Cited

U.S. PATENT DOCUMENTS

| | | | |
|---|---|---|---|
| 492,299 | 2/1893 | Johnston et al. | 83/466 X |
| 872,312 | 11/1907 | Waller | 83/454 |
| 1,013,010 | 12/1911 | Graham | 83/762 |
| 1,745,815 | 2/1930 | Schoepfle | 83/468 |
| 1,896,536 | 2/1933 | Belshaw | 269/38 |
| 2,024,111 | 12/1935 | Phillis | 269/87.2 |
| 2,134,332 | 10/1938 | Hubbard | 83/762 |

FOREIGN PATENT DOCUMENTS

| | | | |
|---|---|---|---|
| 0898535 | 11/1953 | Fed. Rep. of Germany | 83/454 |
| 0663532 | 5/1979 | U.S.S.R. | 269/296 |

*Primary Examiner*—Frank T. Yost
*Assistant Examiner*—Clark F. Dexter
*Attorney, Agent, or Firm*—Roy E. Mattern, Jr.

[57] ABSTRACT

Bulk arrow shafts, of various diameters, obtained from a manufacturer, which are tapered on one end and square cut at the other end, are subsequently securely supported, accurately measured for an arrow length wanted by an archer, and then cut to this measured length by an archer, who uses this portable bulk arrow shaft guide, support, measurement and guided miter-like razor saw cutoff assembly. An elongated planar base of this assembly is made to rest on a work table or on another level surface structure. A top opening central dovetail groove extends throughout the length of this base. A slidably, selectably positioned receiver subassembly, having depending complementary dovetail portions, is removably interfitted with this base, at the measuring end thereof, to hold a tapered end of a bulk arrow shaft at a designated length of the final arrow shaft length. This receiver has oppositely positioned integral pointers to designate the selected length of the arrow shaft that is wanted, in respect both to an inch scale, and to a centimeter scale, i.e. an English and a metric scale, which are on opposite sides of this base. When the receiver is located at the correct length position, a thumb screw, carried by the receiver, is rotated to create a tight fit between the interfitting dovetail portions. At the cutoff length end of this base, an arrow shaft guiding, encompassing, and gripping, Vee block clamp subassembly, having a thumb screw and also having depending complementary dovetail portions, is initially slidably placed and then securely positioned on the base to so remain by using set screws. This subassembly is also formed to include a transverse guiding vertical slot arranged perpendicularly to the longitudinal axis of the base, to slidably receive and to guide a razor saw to be used in cutting the bulk arrow shaft, to create an arrow shaft having the length selected by an archer in respect to her or his sized archery bow and in respect to her or his draw length.

2 Claims, 2 Drawing Sheets

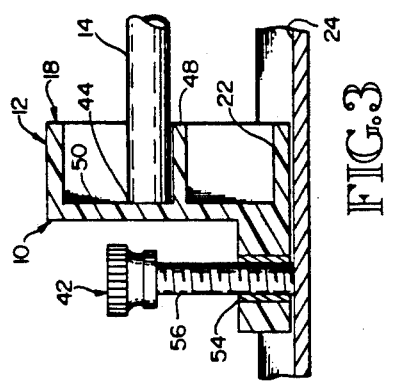
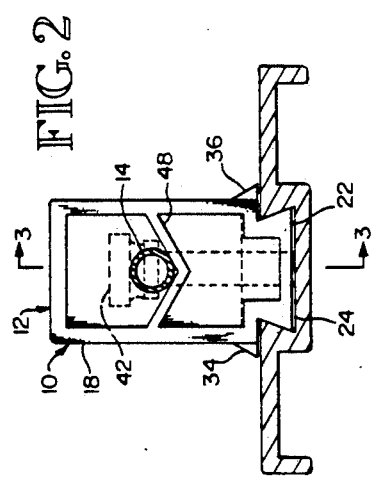
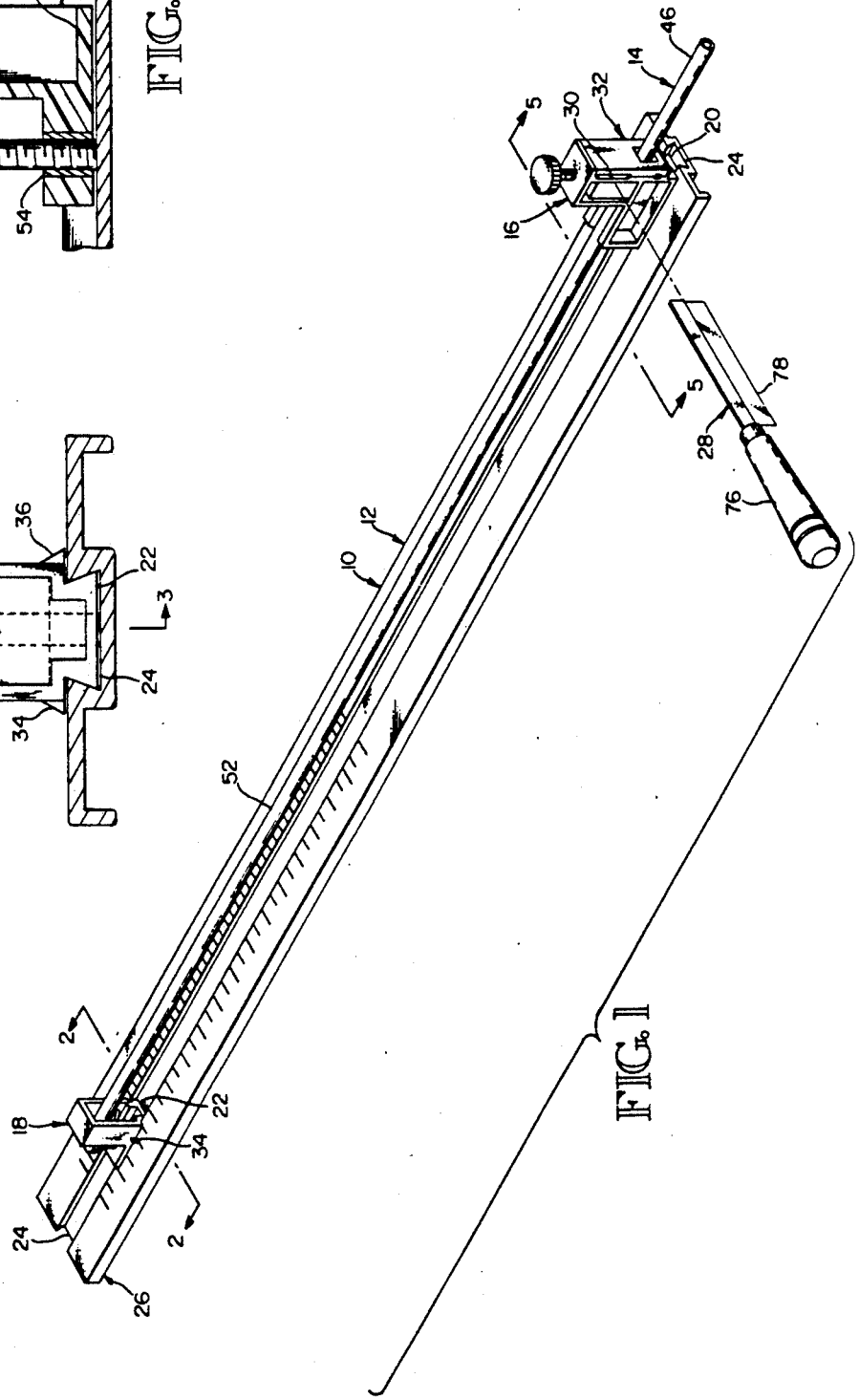

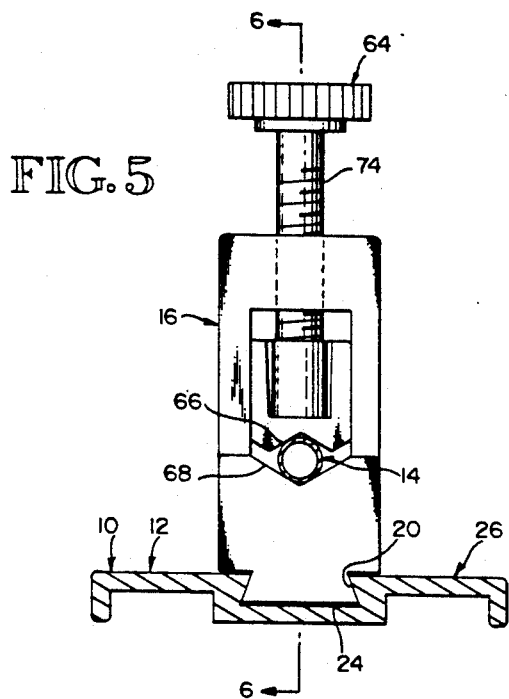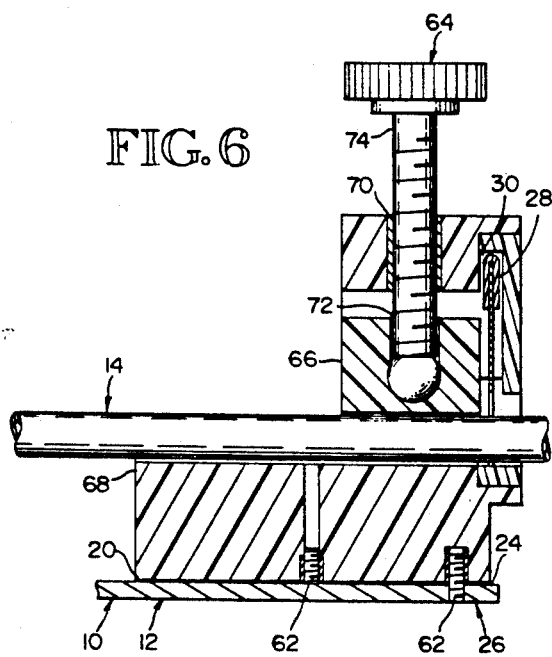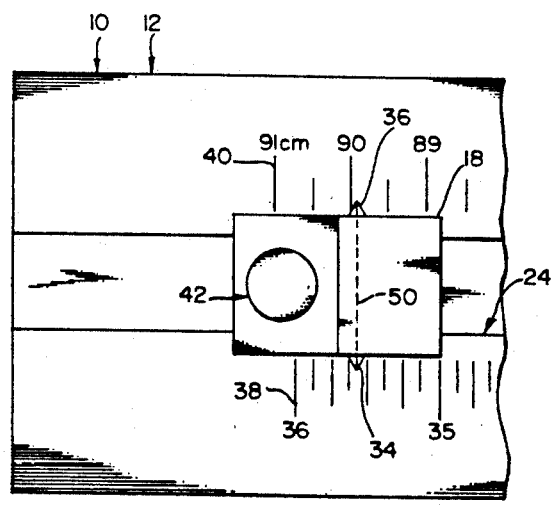

PORTABLE BULK ARROW SHAFT GUIDE, SUPPORT, SECUREMENT, MEASUREMENT, AND GUIDED MITER-LIKE RAZOR SAW CUTOFF ASSEMBLY

BACKGROUND

Because each archer has his or her selected size bow, and also because each archer has his or her personal strength ability to draw back an arrow to a designated draw length, using his or her bow, bulk arrow shafts first produced at a factory, are later generally cut again by an archer, or a person assisting an archer, to provide her or him with a group of custom arrows of equal lengths. This insures that the archer will be shooting the best length arrows, thereby avoiding excess arrow weight, and consequently avoiding a shorter flight of their arrows.

When wood was previously generally used for making arrow shafts, many standard woodworking saws and related equipment were used to cut them to selected lengths. However in comparatively recent years aluminum and fiberglass have been and are being used in making arrow shafts. Then more recently carbon filaments and carbon source materials have been and are being used in manufacturing arrow shafts.

To cut again these aluminum, fiberglass, and carbon bulk arrow shafts, of various diameters, received from a manufacturer, to a length selected by an archer, powered abrasive wheels have been and are being used. Also tube cutters have been and are being used, preferably with pre-inserted mandrels to avoid the partial or full collapsing of a hollow arrow shaft, and with subsequently employed reamers to create a uniform interior diameter to receive inserted portions of an arrow head. In addition, electric motor powered arrow cutoff saw assemblies have been and are being used.

However, there remained a need for a lower cost, yet accurately utilized assembly to guide, hold, measure, and cut a bulk arrow shaft of a selected diameter, to a length designated by an archer. Moreover, this assembly should be portable, as an integrated product, in respect to being conveniently and effectively used at one's home or shop, and also to be taken to a site, where an archer is staying for a while to enjoy the sport of archery.

SUMMARY

Bulk arrow shafts, now being produced by manufacturers, are made of wood, aluminum, fiberglass, and carbon filament materials. To enable an archer to purchase bulk arrow shafts, made of any of these materials, and to cut them or to have them cut to her or to his specific length, a comparatively low cost portable bulk arrow shaft guide, support, securement, measurement, and guided miter-like razor saw, cutoff assembly is available for utilization to accurately cut these shafts made of the respective materials without damaging them.

This assembly has an elongated base, preferably extruded from aluminum, and so formed to have a continuous central open top dovetail groove. At a length determining end, or measuring end thereof, this base slidably receives an injection molded plastic slidably, selectively positioned, receiver subassembly, which has a depending complementary dovetail portion. Also a self carried thumb screw thereof is rotated to create a tight fit between the respective dovetail portions, when this receiver subassembly is located at a designated measuring scale position on this elongated base, to hold the tapered or nock end of a bulk arrow shaft at this arrow shaft length determining position.

At the opposite end of this elongated base, designated as the cutoff end, an arrow shaft guiding, encompassing, and gripping Vee block clamp subassembly, tightened by turning a set thumb screw, and also having depending complementary dovetail portions is secured at this end by fasteners to so remain, unless it must be replaced, if broken, or if the entire assembly is to be disassembled for shipment or storage. This Vee block subassembly, preferably made of injection molded plastic materials, is also formed to integrally provide a transverse guiding vertical slot arranged perpendicularly to the longitudinal axis of the base. A razor saw is slidably positioned and guided by this vertical slot, when being used to cut through a bulk arrow shaft, to create an arrow shaft having the length selected by an archer in respect to her or his sized archery bow and in respect to her or his draw length.

By utilizing this portable bulk arrow shaft, guide, support, securement, measurement, and guided miter-like razor saw, cutoff assembly, an archer repeatedly saws through the bulk arrow shaft at the exact place necessary to create his or her specified length of an arrow shaft. In so doing, the arrow shaft is not damaged by collapsing it, nor by marring it, nor by any other way.

DRAWINGS

A preferred embodiment of a portable bulk arrow shaft guide, support, securement, measurement, and guided miter-like razor saw cutoff assembly is illustrated in the drawings, wherein:

FIG. 1 is a perspective view of this bulk arrow shaft cutoff assembly showing how a bulk arrow shaft of a selected diameter has been guided and centered into a supporting position and secured, as the tapered end of this bulk arrow shaft is centered in a slidably, selectively positioned receiver subassembly, which has been tightened in place along an elongated base, using complementary dovetailed portions of both the base and the receiver, at a measured scale location to determine the length of the resulting arrow shaft, and showing how a razor saw will be inserted and moved back and forth in a transverse guiding vertical slot, arranged perpendicularly to the longitudinal axis of the base, to cut the bulk arrow shaft, when this arrow shaft, after being guided and centered into place, is encompassed and gripped by the Vee block clamp assembly, upon tightening the set thumb screw thereof;

FIG. 2 is a transverse cross sectional view, taken along the section lines 2—2 of FIG. 1, to illustrate how the receiver subassembly and the base, via their respective dovetail portions have been temporarily securely positioned together, upon tightening the thumb screw, at a selected measured length location along the base, to center and to hold the tapered end of a bulk arrow shaft;

FIG. 3 is a longitudinal cross sectional view, taken along section lines 3—3 of FIG. 2, to further illustrate what was shown in FIG. 2, but changing the viewing from a transverse view to a longitudinal view, and showing how the tapered end of the bulk arrow shaft bears against a vertical stop interior wall of the receiver subassembly which is positioned transversely, directly opposite the selected arrow shaft length dimension on either the inch or centimeter scales, i.e. the English or metric scales, set forth on the base;

FIG. 4 is a partial top view of this bulk arrow shaft cutoff assembly illustrating portions of the respective inch or centimeter scales, i.e. English or metric scales, presented on the base, and the respective oppositely positioned pointers of the receiver assembly, which are aligned with the vertical stop interior wall thereof, and which are also aligned with the tapered end of the inserted bulk arrow shaft;

FIG. 5 is a transverse cross sectional view, taken along the section lines 5—5 of FIG. 1, to illustrate how the arrow shaft guiding, encompassing, and gripping, Vee block clamp subassembly having a set screw, also has depending complementary dovetail portions to be initially slidably placed and then securely positioned on the base, and when so positioned, a bulk arrow shaft is guided through to make contact at the tapered end thereof with the receiver subassembly, and thereafter the bulk arrow shaft is firmly centered and clamped, before the cutting thereof; and FIG. 6 is a longitudinal cross sectional view, taken along the section lines 6—6 of FIG. 5, to illustrate how the arrow shaft guiding, centering, encompassing, and gripping, Vee block clamp subassembly is in effect permanently mounted by using set screws holding together the base and the depending complementary dovetail portions of this Vee block clamp subassembly, and also showing the initial guiding of the bulk arrow shaft, the centering thereof, and the clamping thereof, by utilizing the Vee block clamp components, and further illustrating the transverse guiding vertical slot arranged perpendicularly to the longitudinal axis of the elongated base, to slidably receive and to guide the razor saw used in cutting through the bulk arrow shaft.

DESCRIPTION OF THE PREFERRED EMBODIMENT

Overall Arrangement and Utilization

The portable bulk arrow shaft centering guide, support, securement, measurement, and guided miter-like razor saw cutoff assembly 10, in respect to a preferred embodiment 12 thereof, is illustrated throughout all the figures, 1 through 6, of the drawings. The overall arrangement and utilization of this bulk arrow cutoff saw assembly 10 is shown in FIG. 1, when a bulk arrow shaft 14, of a selected diameter, is being held in place, after having been guided through the arrow shaft guiding, encompassing, and gripping Vee block clamp subassembly 16, to reach the slidably, selectably, positioned receiver subassembly 18. Both these subassemblies 16 and 18, have their respective complementary dovetail depending portions 20, 22, which are slidably interfitted with the top opening central dovetail groove 24 of the elongated base 26 of the preferred embodiment 12. These dovetail interfitting portions are preferred and have been selected to serve as a longitudinal central securement receiving means of the elongated base, and the depending complementary securement means of this receiver subassembly and this Vee block clamp subassembly, which respectively fit into this securement receiving means of this base.

When the bulk arrow shaft 14 is so positioned and secured, then a razor saw 28 is moved back and forth transversely to cut through the bulk arrow shaft 14, when precisely guided in the transverse guiding vertical slot 30. This slot 30 is arranged perpendicularly to the longitudinal axis of the elongated base 26, and it is formed in an important end portion 32 of the Vee block clamp subassembly 16. As long as the receiver subassembly 18 remains secured to the elongated base 26, at the selectable location thereof, all the bulk arrow shafts 14, thereafter properly guided, centered, inserted, and held in place, will be cut to the same length. Therefore all the cut arrow shafts will have the length selected by an archer in respect to her or his sized archery bow and in respect to her or his draw length.

The Slidably, Selectably, Positioned Receiver Subassembly

The slidably, selectably, positioned receiver subassembly shown in FIGS. 1 through 4, is moved to selected locations along the top opening central dovetail groove 24, that extends throughout the length of the elongated base 26. The depending dovetail portion 22 of this receiver subassembly slidably interfits with this dovetail groove 24 of the elongated base 26.

As shown in FIG. 4, when the oppositely positioned pointers 34, 36, in respect to one or the other, is correctly positioned on either the inch or English scale 38, or on the centimeter or metric scale 40, which are scribed or printed on the elongated base 26, then the thumb screw 42 is tightened. Thereafter this receiver subassembly 18 remains at the selected location, thereby determining the length of the arrow shafts that are to be cut, in accordance with specification established by an archer, in respect to her or his sized archery bow, and in respect to her or his draw length.

The bulk arrow shaft 14, after having its tapered end 44 inserted through the Vee block clamp subassembly 16, in reference to one direction, or after having its cutoff end 46 inserted through the Vee block clamp subassembly 16, in reference to the other direction, is maneuvered so the tapered end 44 thereof is centered by the Vee shaped arrow shaft receiving structure 48 of this receiver subassembly 18, as shown in FIG. 2. Then when so centered, the tapered end 44 is moved to contact and to continually bear against a vertical stop interior wall 50 of this receiver subassembly 18, as shown in FIG. 3. The common location of this vertical stop interior wall 50 and of the tapered end 44 of the bulk arrow shaft 14 is directly aligned with the transverse positioning of the pointers 34, 36 on this receiver subassembly 18, thereby insuring that the cut-to-size length of the resulting arrow shafts will fully meet the archer's specified length of his or her arrows. Bulk arrow shafts 14 of all diameters are very well received in the Vee shaped arrow shaft receiving structure 48, and in the Vee block clamp subassembly 16.

As long as the set screw 42 remains tightened, the slidably, selectably, positioned receiver subassembly 18 remains in place, so the resulting size arrow shafts 52 of the then specified length will be created, as the remaining arrow shaft portion 46 of each one is cut away. When this receiver subassembly 18 is made of injection molded plastic, or other materials which, if threaded, would not sustain sufficient cycles of threading operations, then a threaded metal insert 54 is secured within this receiver subassembly 18, as illustrated in FIG. 3, to receive the threaded portions 56 of the thumb screw 42. Whenever necessary, this receiver subassembly 18, upon loosening the set screw 42, may be moved along the elongated base 26, or removed entirely, by clearing it from the designated measuring end 58 of this elongated base 26.

Arrow Shaft Guiding, Centering, Encompassing and Gripping Vee Block Clamp Subassembly, Also Having a Transverse Guiding Vertical Slot Receiving a Razor Saw At the designated cutoff end 60 of the elongated base 26 of this preferred embodiment 12, an arrow shaft guiding, centering, encompassing and gripping Vee block clamp subassembly 16 is essentially permanently secured by set screws 62, after having been guided into the dovetail groove 24 of the elongated base 26, utilizing the depending dovetail portion 20 thereof, as shown in FIGS. 1, 5, and 6. When secured in position, the thumb screw 64 thereof is rotated to raise the top Vee clamp portion 66 clear of the stationary bottom Vee clamp portion 68 to create a clearance. Thereafter a bulk arrow shaft 14, of a selected diameter, is guided, centered, and encompassed by these Vee clamp portions 66, 68, until the tapered end 44 is fully positioned in the receiver subassembly 18. Then the thumb screw 64 is rotated to move the top Vee clamp portion 66 toward the stationary bottom Vee clamp portion 68 to firmly contact the bulk arrow shaft 14, as shown in FIGS. 5 and 6. When this Vee block clamp subassembly 16 is made of injection molded plastic, or other materials, which, if threaded, would not wear well over a period of time, then metal threaded inserts 70, 72 are fitted, as shown in FIG. 6, to receive the threaded portions 74 of the set screw 64.

With a bulk arrow shaft 14 accurately positioned, and when both the thumb screws 42, 64 are firmly tightened, and following a recommended second check on the correct measurement location of the receiver subassembly 18, then the cutting of this bulk arrow shaft 14 is undertaken to cut away the arrow shaft portion 46, while retaining the arrow shaft 52 of the specified length. To do so, the archer uses the razor saw 28, gripping the handle 76 and moving the blade 78 transversely back and forth, while these movements of the razor saw 28 are controlled by the guiding boundaries of the transverse guiding vertical slot 30, arranged perpendicularly to the longitudinal axis of the elongated base 26. When subsequently, the thumb screw 64 is turned to loosen the Vee block clamp subassembly 16, the arrow shaft 52 of the specified length is conveniently removed.

Thereafter, if another arrow shaft 52 of the same length is wanted, a bulk arrow shaft 14 is inserted, fully positioned, then clamped, cut, unclamped, and conveniently removed. This operation is continued to make arrow shafts 52 of the same specified length wanted by an archer, which he or she has determined to be the best length in respect to her or his sized archery bow, and in respect to her or his draw length. If arrows are to be cut for another archer, then if his or her specified arrow length is different, the receiver subassembly 18 will be slidably relocated on the elongated base 26, after loosening and then tightening the set screw 42. At all times, this portable bulk arrow shaft, guide, centering, support, securement, measurement, and guided miter-like razor saw cutoff assembly 10, as illustrated in this embodiment 12, or as arranged in other like functioning embodiments, not shown, provides an archer with comparatively low cost equipment which, at any location, is very readily utilized to accurately create arrow shafts of selected diameters, having the length best suited to her or to his archery performance requirements.

I claim:

1. A portable bulk arrow shaft guide, centering, support, securement, measurement, and guided miter-like razor saw cutoff assembly, also referred to as an arrow shaft cutoff saw assembly, comprising:
   a. an elongated base having a longitudinal central securement receiving means;
   b. a slidably, selectably, positioned receiver subassembly having depending complementary securement means for entry into the longitudinal central securement receiving means of the elongated base, positioned and changeably secured to the elongated base, to receive a tapered end of a bulk arrow shaft;
   c. a clamping subassembly having depending complementary securement means for entry into the longitudinal central securement receiving means of the elongated base, positioned and secured to the elongated base, to receive and to firmly hold a bulk arrow shaft, and having a vertical slot transversely arranged perpendicularly to the elongated base to slidably receive and to guide a razor saw;
   d. a measurement scale on the elongated base used in positioning the slidably, selectably, positioned receiver subassembly along the elongated base at different locations to respectively cut arrow shafts to the respective lengths indicated on the measurement scale;
   e. a first thumb screw means, to removably position the slidably, selectably, positioned receiver subassembly on the elongated base at a respective selected measurement location, with respect to cutting a specified length from a bulk arrow shaft, to create an arrow shaft wanted by an archer;
   f. a second thumb screw means to open and to close the clamping subassembly respectively, to receive and to grip the bulk arrow shaft;
   g. an opposed Vee block subassembly, which is a portion of the clamping subassembly, and is operated by the second thumb screw means, to be opened to receive a bulk arrow shaft of a selected diameter, and to be closed to firmly hold the bulk arrow shaft during the cutting thereof, when the razor saw is used;
   h. the longitudinal central securement receiving means of the elongated base, the depending complementary securement means of the slidably, selectably, positioned receiver subassembly, and the depending complementary securement means of the clamping subassembly, are all of the overall dovetail components arrangement, thereby permitting their slidable engagement along the elongated base; and
   the clamping subassembly is thereafter fastened securely to the elongated base of the designated cutoff end thereof using set screws;
   i. a transverse projecting pointer portion on the slidably, selectably, positioned receiver subassembly, to point to a definite dimension on the measurement scale, indicating the prospective length of an arrow shaft to be created, when the bulk arrow shaft is subsequently cut; and
   j. a Vee structure and a vertical stop interior wall structure, on the slidably, selectably, positioned receiver subassembly, which together accurately position the inserted tapered end of a bulk arrow shaft.

2. An arrow shaft cutoff saw assembly, as claimed in claim 1, comprising, in addition, a razor saw positioned in the vertical slot of the clamping subassembly, for guided transverse movement, undertaken to cut through the bulk arrow shaft, to create a specified length arrow shaft, to match the length selected by an archer in respect to her or his sized archery bow and in respect to her or his draw length.

* * * * *